UNITED STATES PATENT OFFICE.

EMIL HELBING, OF HAMBURG, GERMANY.

PROCESS OF PRODUCING ARTIFICIAL WOOD.

SPECIFICATION forming part of Letters Patent No. 694,014, dated February 25, 1902.

Application filed October 4, 1901. Serial No. 77,595. (No specimens.)

*To all whom it may concern:*

Be it known that I, EMIL HELBING, a subject of the Emperor of Germany, and a resident of Hamburg, Germany, have invented a certain new and useful Improved Process for Producing Artificial Wood, of which the following is a description.

The present invention consists of a process for producing artificial wood, as hereinafter set forth, and particularly pointed out in the claim.

As is well known, turf has hitherto been employed for producing artificial wood, the turf first being reduced to a fibrous condition and then the acid removed from the same, so that the resulting product consisted of a woolly matted mass of fibers. This resultant mass was then mixed with two parts, by volume, of plaster-of-paris and from ten to twelve parts, by volume, of water—*i. e.*, with a pasty plaster-of-paris and glue mass. The whole had then to be subjected to high hydraulic pressure for a very considerable time, (about half an hour,) artificially dried, and finally oiled or provided with some other suitable coating.

The object of the present invention is to simplify this process, and with this object in view the present process is carried out in the following manner: The turf in its natural fibrous form is first washed and the resulting mass, which is damp, mixed with a compound consisting of hydrate of lime and an aluminium compound—such, for instance, as aluminium-sulfate—the whole while moist being then pressed for a short time, and finally allowed to harden in the atmospheric air.

In this process the pressure required is comparatively small, and the time during which it is subjected to the pressure is short, the air being used to harden it instead of artificial drying-chambers. The product is not hygroscopic, and therefore need not be provided with any coating when it is to be used in the open air. Since the pressing only requires a few minutes, it is possible to produce more artificial wood in the same time.

I claim as my invention—

A process for producing artificial wood which consists in first thoroughly washing turf, and retaining as far as possible its natural fiber, then adding a mixture of hydrate of lime and sulfate of aluminium, then pressing while moist in the manner and for the purpose substantially as described.

In witness whereof I have hereunto set my hand in presence of two witnesses.

EMIL HELBING.

Witnesses:
   E. H. L. MUMMENHOFF,
   OTTO W. HELLMRICH.